Figure 1:
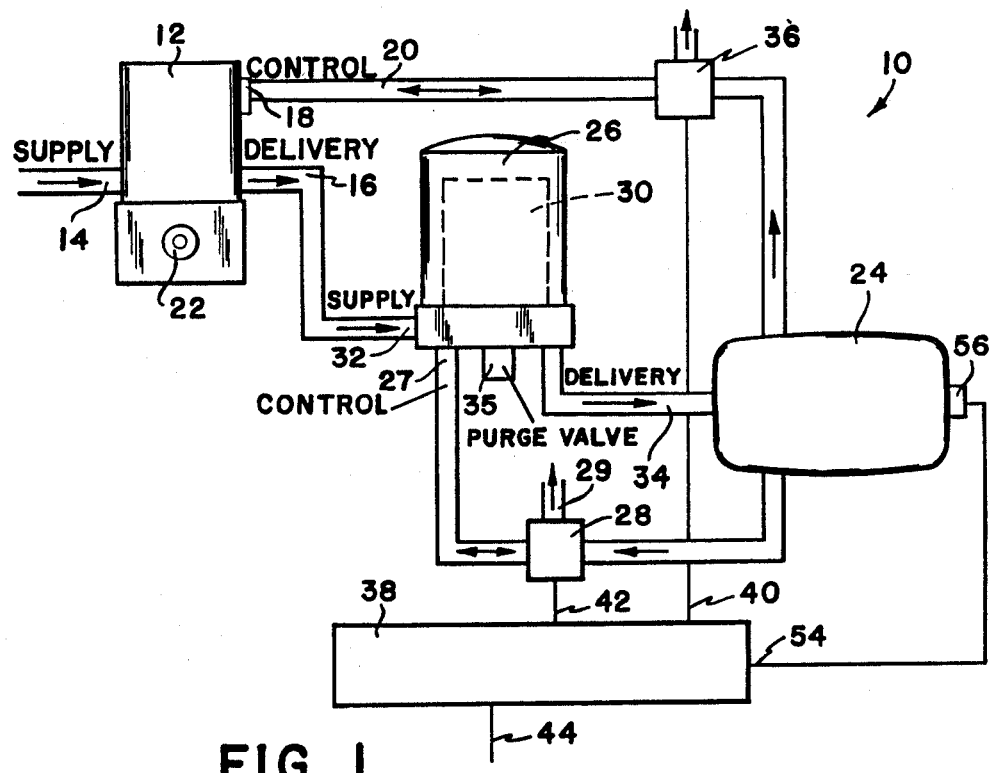

United States Patent [19]

Cramer et al.

[11] Patent Number: 4,936,026

[45] Date of Patent: Jun. 26, 1990

[54] CHARGE/PURGE CONTROL SYSTEM FOR AIR DRYER

[75] Inventors: Kenneth L. Cramer, Avon Lake; Robert D. Krieder, Sullivan, both of Ohio

[73] Assignee: Allied-Signal Inc., Morristown, N.J.

[21] Appl. No.: 301,427

[22] Filed: Jan. 26, 1989

[51] Int. Cl.$^5$ ............................................. F26B 19/00
[52] U.S. Cl. ............................................. 34/53; 34/80
[58] Field of Search .......................... 34/53, 80, 27, 33; 303/85, 59, 60, 61; 55/213, 212

[56] References Cited

U.S. PATENT DOCUMENTS

| | | |
|---|---|---|
| 2,834,638 | 5/1958 | George . |
| 3,402,972 | 8/1966 | Cooper et al. . |
| 3,726,307 | 4/1973 | Carman et al. . |
| 4,083,608 | 4/1978 | Shirey . |
| 4,524,311 | 6/1985 | Yokota et al. . |
| 4,652,801 | 3/1987 | Burdett . |

*Primary Examiner*—Henry A. Bennet
*Attorney, Agent, or Firm*—Ken C. Decker; William N. Antonis

[57] ABSTRACT

A compressed air system includes an electronic control which controls enabling and disabling of the compressor in response to pressure level variations in the system storage reservoir. The control unit responds to compressor disabling by causing the system air dryer to regenerate or purge for a predetermined time period, even if the compressor is unloaded for time periods greater than the predetermined time period. If the compressor comes back on load before expiration of the predetermined time periods, purging of the air dryer is immediately discontinued. Accordingly, the air dryer is never purged for long periods of time, thereby conserving the desiccant used in the air dryer, and also increasing the efficiency of the engine which operates the air compressor, since turbocharged engines normally communicate the output of the turbocharger to the air compressor, and venting a portion of the turbocharger for long periods of time can significantly decrease engine efficiency.

8 Claims, 1 Drawing Sheet

CHARGE/PURGE CONTROL SYSTEM FOR AIR DRYER

This invention relates to a system for controlling the charging and purging cycles of an air dryer used in a compressed air system.

Compressed air systems are used to operate many mechanical devices, and are particularly useful in braking systems for heavy vehicles and for operating industrial controls. These systems include an air compressor which compresses ambient air and charges a storage reservoir. In a compressed air braking system, the air compressor is operated by the engine of the vehicle. A governor is responsive to the pressure in the reservoir for unloading or disabling the compressor when the pressure level in the storage reservoir attains a predetermined pressure level, The governor enables or loads the compressor when the pressure in the reservoir drops to another predetermined reference level. Some compressors used on automotive vehicles are powered through an electromagnetic clutch which is engaged and disengaged in response to the pressure level in the storage reservoir to thereby disable and enable the air compressor.

It has become common to provide compressed air systems with an air dryer, which dries the compressed air generated by the air compressor before it is communicated to the storage reservoir. These air dryers commonly provide a desiccant through which the air is communicated. A small quantity of air is segregated, and is used to regenerate or purge the desiccant when the compressor is disabled. However, existing systems use air dryers in which the purge valve controlling purging or regeneration of the desiccant is open to atmosphere at all times while the compressor is unloaded or disabled. Since many such compressed air systems are used to operate the braking systems of large, line haul trucks, which are operated at highway speeds continually for hours at a time, the compressor on such vehicles is unloaded or disabled for ninety percent or more of the time that the vehicle is operated. This means that the purge valve is opened almost continuously, thereby venting not only the desiccant to atmosphere, but also venting the line communicating the inlet of the air dryer with the outlet of the compressor. Since it is common to connect the inlet of the compressor with the outlet of the turbocharger so that the compressor is initially supplied with air at or above atmospheric pressure, the open purge control valve in the air dryer during regeneration of the desiccant provides a path for this compressor inlet air to be vented to atmosphere. This reduces the operating efficiency of the vehicle engine if the vehicle is equipped with a turbocharger or supercharger.

The present invention solves the problems inherent in the mechanical purge valve used on prior art air dryers by providing an electronic control which controls the charging and purging cycles of the air dryer and assures that the purge valve will not remain open longer than necessary to regenerate the desiccant. Furthermore, control of the loading and unloading of the compressor is made more precise.

Figure 2:
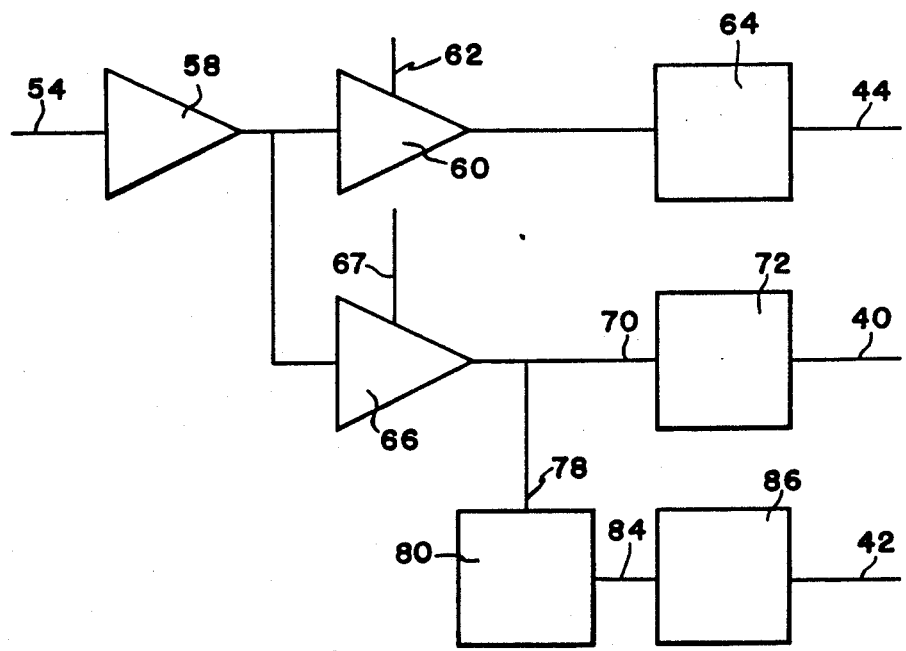

These and other advantages of the present invention will become apparent from the following description with reference to the accompanying drawings in which:

FIG. 1 is a diagrammatic illustration of a compressed air system with an air dryer charge/purge control made pursuant to the teachings of the present convention; and FIG. 2 is a schematic illustration of the electronic control system used in the compressed air system of FIG. 1.

Referring now to the drawing, a compressed air system generally indicated by the numeral 10 includes a conventional automotive air compressor 12 having an inlet 14, an outlet or delivery 16, and a conventional unloader 18 which unloads the compressor 12 during periods when compressed air is not needed. The unloader 18 responds to pressure signal communicated thereto through line 20 to load and unload the compressor 12. The compressor 12 is powered by the engine (not shown) of the vehicle through a drive pulley 22. Alternatively, the pulley may include an electromagnetic clutch mechanism of conventional design in lieu of the unloader 18. Accordingly, the compressor 12 is then disabled and enabled by actuation and disengagement of the electromagnetic clutch enclosed within pulley 22 instead of by the unloader 18. The inlet 14 may be communicated with ambient air through an air cleaner (not shown) or, if the engine operating the air compressor 12 is equipped with a turbocharger or supercharger, the inlet 14 may be communicated to the pressurized air at the outlet of these devices.

The outlet or delivery 16 of the air compressor 12 is communicated to a conventional storage reservoir 24 through an air dryer 26. The air dryer 26 includes a cannister of desiccant material 30 which is enclosed within the air dryer housing. An inlet or supply 32 communicates air into the air dryer 26, and an outlet or delivery 34 communicates air into a conduit communicating with the storage reservoir 24. A purge valve 35 communicates the air dryer 26 to atmosphere to purge the desiccant.

A conventional solenoid valve 36 is installed in the line 20 which communicates the storage reservoir 24 with the control port of the unloader 18. Solenoid valve 36 is controlled by an electronic control unit 38. Electronic control unit 38 will be described in detail later herein with respect to FIG. 2. Electronic control unit 38 includes an output 40, which is connected to the solenoid valve 36, another output port 42, which is connected to a purge control valve 28, which is also solenoid actuated, and a third output port 44 which is connected to a warning device (not shown), which is mounted in the operator's compartment. The solenoid valve 28 is a conventional three-way solenoid valve which in its unactuated condition vents the control port 27 of air dryer 26 to atmosphere vent 29 and closes communication between valve 28 and the reservoir 24. However, when a signal is generated on output port 42, valve 28 is actuated so that the vent 29 is closed and communication is initiated between reservoir 24 and control port 27, thereby purging the air dryer 26. Electronic control unit 38 further includes an input terminal 54 which is connected to a conventional pressure sensor 56 which measures the pressure level in the storage reservoir 24 and generates an electrical signal which varies in accordance therewith.

Referring now to FIG. 2, the details of the electronic control unit will be described in detail. The signal from sensor 56, which is received on input terminal 54 and amplified by amplifier 58, is then transmitted to low pressure warning comparator 60. Comparator 60 compares the output of sensor amplifier 58 with a predetermined reference value received at input 62 and generates an output signal when the value of the signal generated by amplifier 58 drops below the threshold set at input 62. The output signal from comparator 60 actuates low pressure warning signal driver 64, which generates a signal on terminal 44 which actuates the low pressure warning indicator.

The output of sensor amplifier 58 is also transmitted to compressor unloading comparator 66, which compares the output of amplifier 58 with a predetermined threshold value set on input 67. When the output of sensor amplifier 58 exceeds the threshold level set on 67, comparator 66 generates an output signal which is transmitted to terminal 70 of a compressor unloader driver 72. Compressor unloader driver 72, in response to a signal on the terminal 70 thereof, generates an output signal on the terminal 40, which is transmitted to the solenoid valve 36. Solenoid valve 36 responds to signal to open communication between the reservoir 24 and the input port of the unloader 18, thereby transmitting a signal causing it to unload the compressor 12. In the alternate embodiment wherein the drive pulley 22 includes an electromagnetic clutch, the terminal 40 would be connected directly to the clutch to cause the clutch to disconnect the compressor 12 from driving engagement with the vehicle engine.

The output of comparator 66 is also transmitted to the input 78 of air dryer purge timer 80. Timer 80 responds to the leading edge of a signal transmitted to input 78 by generating a signal at the output 84 of timer 80 which expires after a predetermined time period. The output 84 is connected to the input of an air dryer purge driver 86 which generates a signal in response to the signal at the output 84 which actuates the solenoid valve 28.

In operation, air compressor 12 is operated by the vehicle engine to charge the reservoir 24, it being noted that, as long as the pressure level in the reservoir 24 is below the value of the high setpoint at input 67 that the solenoid valve 36 will cut off communication to the unloader 18. Solenoid valve 28 remains in its normal state in which control port 27 of air dryer 26 is vented. When the pressure level in reservoir 24, as measured by sensor 56, exceeds the level set at input 67 of comparator 66, valve 36 is actuated by driver 72, so that a pressure signal is transmitted to the unloader 18 causing the latter to unload air compressor 12, thereby terminating its pressure output. At the same time, a signal from comparator 66 starts the predetermined time period of timer 80, thereby operating air dryer purge driver 86 to cause the solenoid 28 to actuate, thereby cutting off communication between control port 27 and the vent 29, and initiates communication with reservoir 24 which provides a pressure signal actuating purge valve 35. Accordingly, activation of purge valve 35 communicates the air dryer 26 with atmosphere, thereby causing the quantity of air stored within air dryer 26 to exhaust to atmosphere, thereby purging the desiccant 30 of its moisture. When the timer 80 times out, purge control solenoid valve 28 is deactuated, thereby cutting off communication between control port 27 and reservoir 24 and venting control port 27 through vent 29, thereby terminating purging of the air dryer 26. However, since the air compressor 12 is still unloaded and is not generating a pressure output, no compressed air is communicated to the air dryer 26.

When the pressure level sensed by sensor 56 drops below the level set by the low setpoint 67 of comparator 66, the signal to driver 72 is turned off, thereby turning off the signal on terminal 40 and causing the valve 36 to cut off the pressure signal to the unloader 18. Accordingly, the compressor 12 comes on load again, generating a pressure output which is communicated to the storage reservoir 24 through air dryer 26. If the compressor comes on load again before the timer 80 has timed out, the timer 80 automatically responds to the change of state at the output of comparator 66 to reset itself and terminate the signal to driver 86, thereby immediately deactuating valve 28 before the timer would have normally timed out. Accordingly, it will be noted that purging of the air dryer is limited to the predetermined time period if the compressor valve is unloaded for time periods greater than the predetermined time period, but the purging is immediately discontinued if the compressor comes back on load before the predetermined time period expires. The air dryer 26, and therefore the pressure level at the engine turbocharger communicated through the air compressor 12 when unloaded, is never open to atmosphere for long periods of time, thereby increasing engine efficiency over prior art systems due to the fact that no pressure is lost from the turbocharger for excessive time periods that prior art air dryers were open to atmosphere.

We claim:

1. Compressed air system comprising an air compressor for compressing air, a storage reservoir for storing compressed air, said air compressor having a compressed air outlet connected to said storage reservoir and disabling means responsive to a first electrical signal generated in response to variations of the pressure level in said storage reservoir for disabling said air compressor when the pressure level in the storage reservoir attains a predetermined pressure level and for again enabling said air compressor when the pressure level in the reservoir drops to a predecided pressure level, an air dryer connected between the compressed air outlet and said storage reservoir for removing entrained moisture in the compressed air communicated to said storage reservoir, said air dryer including a desiccant requiring periodic purging when said compressor is disabled, purge means responsive to a second electrical signal for purging said desiccant, and timer means for generating said second electrical signal in response to said first electrical signal, said timer means limiting generation of said second electrical signal to a predetermined time period if said compressor is disabled for a time period greater than said predetermined time period.

2. Compressed air system as claimed in claim 1, wherein said timer means includes means for terminating said second signal and resetting said predetermined time period if the compressor is enabled within said predetermined time period.

3. Compressed air system as claimed in claim 2, wherein said system includes pressure sensing means for generating a third electrical signal which varies as a function of the pressure level in said storage reservoir and comparator means for comparing said third electrical signal with a predetermined reference signal representing said predetermined reference level, said comparator means generating said first electrical signal when the level of said third electrical signal drops below said predetermined reference level.

4. Compressed air system as claimed in claim 3, wherein said disabling means includes a compressor unloader having an inlet for receiving a pressure signal, said unloader being responsive to said pressure signal for disabling said compressor, conduit means for communicating said inlet with the storage reservoir, and electrical actuated valve means in said conduit means responsive to said first electrical signal for controlling communication of a pressure signal to said inlet.

5. Compressed air system as claimed in claim 3, wherein said air compressor is driven by the engine of a motor vehicle, and said disabling means includes an electromagnetic clutch coupling the air compressor with the engine, said clutch being responsive to said first electrical signal to couple and uncouple the compressor and engine thereby enabling and disabling said air compressor.

6. Compressed air system as claimed in claim 1, wherein said system includes pressure sensing means for generating a third electrical signal which varies as a function of the pressure level in said storage reservoir and comparator means for comparing said third electrical signal with a predetermined reference signal representing said predetermined reference level, said comparator means generating said first electrical signal when the level of said third electrical signal drops below said predetermined reference level.

7. Compressed air system comprising an air compressor for compressing air, a storage reservoir for storing compressed air, said air compressor having a compressed air outlet connected to said storage reservoir and disabling means responsive to the pressure level in said reservoir for disabling said air compressor when the pressure level in the reservoir attains a predetermined pressure level and for again enabling said air compressor when the pressure level in the reservoir drops to a predecided pressure level, an air dryer connected between the compressed air outlet and said storage reservoir for removing entrained moisture in the compressed air communicated to said storage reservoir, said air dryer including a desiccant requiring periodic purging when said compressor is disabled, purge valve means for controlling purging of said desiccant, and purge valve control means for controlling said purge valve means to limit purging of said desiccant to a predetermined time period if said compressor is disabled for a time period greater than said predetermined time period.

8. Compressed air system as claimed in claim 7, wherein said purge valve control means includes timer means for operating said purge valve control means for said predetermined time period only if the compressor is disabled for a time period greater than said predetermined time period, said timer means being responsive to disabling of said air compressor to operate said purge valve means.

* * * * *